US006374198B1

(12) United States Patent
Schifa et al.

(10) Patent No.: US 6,374,198 B1
(45) Date of Patent: Apr. 16, 2002

(54) METHOD FOR THE CREATION OF TRIDIMENSIONAL NUMERICAL MODELS

(75) Inventors: Maurizio Schifa, Castelfranco Emilia MO; Paolo Bacoccoli, Padova PD, both of (IT)

(73) Assignee: Mirai S.r.l., Calderara di Reno. Bo (IT)

(*) Notice: Subject to any disclaimer, the term of this patent is extended or adjusted under 35 U.S.C. 154(b) by 0 days.

(21) Appl. No.: 09/214,991

(22) PCT Filed: Jul. 10, 1997

(86) PCT No.: PCT/EP97/03658

§ 371 Date: Mar. 8, 1999

§ 102(e) Date: Mar. 8, 1999

(87) PCT Pub. No.: WO98/02850

PCT Pub. Date: Jan. 22, 1998

(30) Foreign Application Priority Data

Jul. 11, 1996 (IT) ........................................ BO96A0381
Nov. 7, 1996 (IT) ........................................ BO96A0562

(51) Int. Cl.[7] ............................ G06F 9/45; G06T 17/00
(52) U.S. Cl. ............................ 703/2; 703/1; 345/420; 702/153
(58) Field of Search ............................ 703/1, 2, 6; 345/419, 345/420; 700/98; 702/152, 153; 356/601, 614

(56) References Cited

U.S. PATENT DOCUMENTS

| | | | |
|---|---|---|---|
| 4,979,224 A | | 12/1990 | Maiocco et al. |
| 5,107,444 A | | 4/1992 | Wu |
| 5,128,870 A | | 7/1992 | Erdman et al. |
| 5,148,372 A | | 9/1992 | Maiocco et al. |
| 5,396,160 A | | 3/1995 | Chen |
| 5,517,602 A | * | 5/1996 | Nararajan .................... 345/419 |
| RE35,816 E | * | 6/1998 | Schulz ........................ 356/376 |
| 5,945,996 A | * | 8/1999 | Migdal et al. ............... 345/420 |
| 5,988,862 A | * | 11/1999 | Kacyra et al. ................. 703/6 |
| 6,044,170 A | * | 3/2000 | Migdal et al. ............... 382/154 |

FOREIGN PATENT DOCUMENTS

WO     WO 95 21410     8/1995

OTHER PUBLICATIONS

Huang et al., "Efficient Digitizing of Sculputered Surfaces Using Wavelet Transform", Proc. 1997 IEEE Inter. Conf. Robotics and Automation, vol. 2, pp. 1312–1317, Apr. 1997.*

Kwok et al., "Rapid 3–D Digitizing and Tool Path Generation for Complex Shapes", Proc. 1998 IEEE Inter. Conf. on Robotics and Automation, pp. 2789–2794, May 1998.*

(List continued on next page.)

Primary Examiner—Russell W. Frejd
(74) Attorney, Agent, or Firm—Sughrue Mion, PLLC (57) ABSTRACT

A method for the creation of numerical models of surfaces by acquisition of points from a tridimensional actual model, comprises the steps of identifying a first group of points (X) on at least one boundary (12a, 13a, 14a) defined on the surface (11) of the actual model (10), acquiring the values of the spatial coordinates of the first group of points (X) by means of an acquisition system, and generating a numerical representation of a theoretical surface whose boundary is defined by these points (X). A subsequent step of the method comprises the operation of the acquisition system in order to acquire the coordinates of a second group of points of the actual model, directing it towards the estimated position of nodal points belonging to the theoretical surface. In a last step of the method, a numerical or mathematical representation of the surface of the actual model is generated which satisfies the condition of passing through at least the points of the second group. The method also preferably comprises a step of optimization of the path of the acquisition system, which can comprise contact or non-contact type probes, or even a processing module to identify data of actual points in a preliminarily defined point cloud.

20 Claims, 3 Drawing Sheets

OTHER PUBLICATIONS

Vinarub et al., "Reverse Engineering 'A New Definition for the Nineties'", Proc. IEEE 1992 National Aerospace and Electronics Conf., vol. 3, pp. 1213–1219, May 1992.*

Young et al., "Three Dimensional Surface Digitizer for Facial Contour Capture", IEEE Engineering in Medicine and Biology Magazine, vol. 13, Issue 1, pp. 125–128, Mar. 1994.*

Gueziec et al., "The Wrapper Algorithm: Surface Extraction and Simplification", Proc. IEEE Workshop on Biomedical Image Analysis, pp. 204–213, Jun. 1994.*

Aubry et al., "Three–Dimensional Model Construction from Multiple Sensor Viewpoints", Proc. 1995 IEEE Intern. Conf. on Robotics and Automation, vol. 2, pp. 2054–2059, May 1995.*

* cited by examiner

METHOD FOR THE CREATION OF TRIDIMENSIONAL NUMERICAL MODELS

FIELD OF THE INVENTION

The present invention refers to the creation of numerical models representing tridimensional actual models. The invention was developed with particular reference to the creation of models of tridimensional surfaces. One particular application sector of the invention refers to the creation of numerical models of surfaces by means of the acquisition of points from a tridimensional actual model.

In particular, although not exclusively, the invention was developed to be applied to technical sectors which require computer processing of numerical or mathematical models of so-called "sculptured" surfaces, such as for example those of motor vehicle body parts, of fairings, of shaped paneling, of casings for electrical appliances, of articles in the sector of design or ornamental models, of protective guards for machines or motors, which cannot be identified as union or development of elementary or primitive surfaces.

BACKGROUND OF THE INVENTION

The known methods for the creation of numerical models of sculptured surfaces mainly use acquisition systems comprising continuous probes which explore the characteristics of the surface of a tridimensional actual model, providing an enormous mass of output data which represent the spatial coordinates of an equally high number of separate points of the surface of the model. This enormous amount of information is then processed by a computer programmed to provide output data which represent the shape of the surface of the actual model and which can be subsequently used by designers for any kind of analysis, calculation, modification or electronic processing of the characteristics of the surface itself. For example, the numerical or mathematical model of the surface can be used as input data for programs which calculate the resistance to certain types of stress, for Computer Aided Design (CAD) programs or for Computer Aided Manufacturing (CAM) programs and the like. The principle on which the above type of known systems is based is that the closer the points measured on the surface of the actual model are to each other, the more faithful the numerical reconstruction of a model with this surface will be. The utmost development of this principle has led to the production of increasingly sophisticated measuring instruments, which are able to supply the computer with the data of so-called "point clouds" to emphasize the high surface unit density.

However, the above-mentioned known systems for the creation of numerical models of sculptured surfaces encounter obvious limitations in defining numerical models of surfaces which must be subsequently processed electronically. The processing programs are in fact generally designed for the input of a much lower quantity of data than is generated by the known "point cloud" measurement systems. In many of these programs, moreover, the input points represent the same number of "nodes" of the mathematical model, on which also rather complex calculations are made and whose relative position also significantly affects the output results. This aspect is well known to expert technicians involved in structure resistance calculations, for whom the preliminary task of identifying the nodes, the so-called "meshing" phase of the model, often takes priority with respect to the actual calculation phase since an incorrect selection of the nodes can lead to totally unreliable results. A similar problem is encountered by designers who use CAD programs, who often find it difficult, if not impossible, to electronically handle surfaces identified by Incorrectly selected parameters or nodes. The modification, stretching or junction of bad numerical models of surfaces can lead to unforeseeable results, such as an unforeseen discontinuity in modified modeled surfaces, which are usually difficult to correct.

Furthermore, an additional disadvantage of the known procedures for the creation of numerical models derives from the fact that to obtain a surface model that can be easily processed by the programs used by designers, the data of the "point clouds" must be processed by the application of algorithms which provide a reduced number of numerical parameters representing the shape of the surface of the actual model. While it is fairly simple to realize at a glance that the sculptured surfaces of actual models have a generally harmonic development and are well joined together, it is extremely difficult to design a good program which can identify, select or calculate precisely those nodal points from the enormous quantity of data from the "point clouds" which can effectively represent the shape of these surfaces. Minor errors in the data of a few points of all those acquired can propagate without control in the calculation of numerical models of surfaces, without taking into account the fact that, due to the large quantity of input data, this calculation may prove to be long and costly and require calculation power that is often not available.

One radically different system with respect to the processing of point clouds for the mathematical representation of actual models is described in the document U.S. Pat. No. 4,979,224. According to this known system, the surface of the article which must be modeled is divided into one or more areas and an acquisition machine is operated to acquire the measurement of points along the boundaries of the areas with a certain degree of precision. The boundaries are mathematically modeled by means of algorithms and equations which minimize the deviation from the measured points. The surface of each area on the actual article is then measured at selected points and the values are compared to the values derived from the modeling equations at the same points and the equations are modified to minimize the deviation of the model from the measured points. The procedure is repeated by means of subsequent iterations until the required degree of surface modeling accuracy is achieved.

One disadvantage of this known system consists of the fact that there is no guarantee that the iterative procedure converges towards a mathematical surface model that, at each subsequent iteration, becomes more similar to the actual surface. Another disadvantage consists of the fact that the calculation of the minimum deviation of the model compared with the measured points implies the resolution of equation systems that, iteration after iteration, are of higher orders, meaning that the procedure must inevitably be interrupted when the available calculation power is no longer sufficient, regardless of the accuracy achieved. In addition, the complexity of the calculations necessary to model complex surfaces requires the adoption of powerful and expensive computers and the use of processing times which can be considerable.

The continuous probes used in the known type systems can be the contact type or the non-contact type, for example laser probes. These latter probes emit a beam of electromagnetic waves, in particular a beam of laser light, along a predetermined axial direction and, by means of a receiver, can detect the spatial position of a point on the surface of the object on which the electromagnetic waves are reflected.

A first known type of laser probe, which will be identified subsequently with the term "measurement band type", transmits an analogue or digital output signal proportional to the distance of the point on the surface from the probe along the predetermined axial direction.

Figures 3, 4:
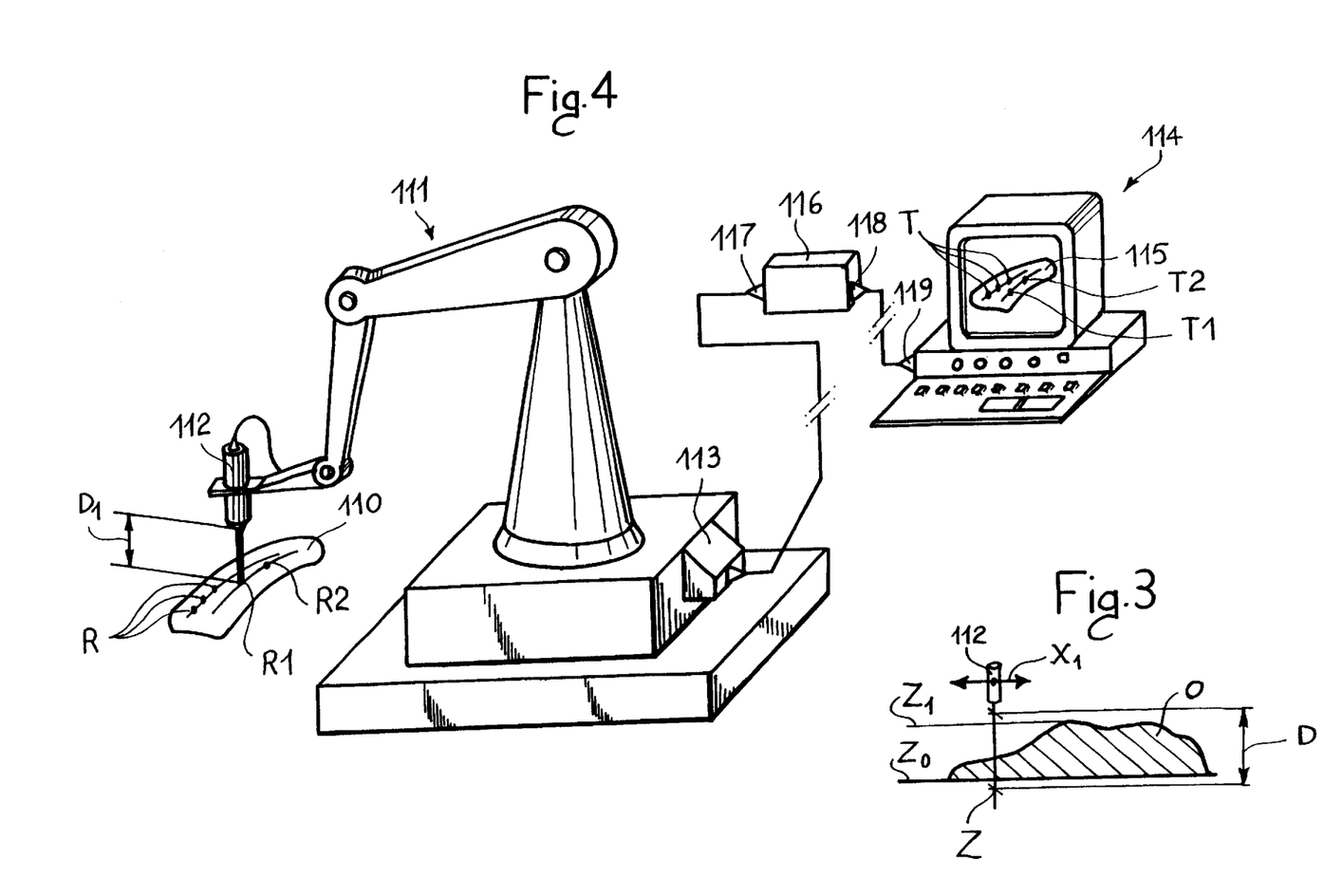

As shown in FIG. 3, in the known acquisition systems using laser probes of the above-mentioned first type, one or more probes 12 are translated along a direction $X_1$ at a predetermined distance from an object O whose outline is to be detected, in such a way that the furthermost $Z_0$ and the closest point $Z_1$ of the object are included in the measurement band D of the probe, which sends an analogue or digital output signal, proportional to the distance of the outline of the object O along the predetermined measurement axis Z, to a processing system.

The known type of measuring systems mentioned above using measurement band type laser probes have the disadvantage of being difficult to use when the object to be measured has a highly complex surface. In such cases, it is in fact necessary to use probes with a very wide measurement band, implying high costs and low measuring precision. In certain cases, moreover, probes with sufficiently wide bands may not even be available.

An alternative system for detecting points on the surface of a tridimensional object uses the second type of laser probes, which we shall subsequently define as "fixed focus type" or fixed measurement point-type, whose behaviour in terms of acquisition operations, is fully comparable to the one of standard mechanical probes, the only difference being that there is no contact with the surface of the object when the measurement is made.

The path followed by a probe of this second type fitted on known types of measuring machines is very similar to that of a mechanical probe:

rapid approach towards the object according to a substantially perpendicular direction with respect to its surface at the point to be acquired, slowed-down precision approach until the focusing point is reached, transmission of a trigger signal to a control device connected to the laser probe, withdrawal of the sensor perpendicular to the surface of the object, movement of the sensor to a different point on the surface of the object.

The steps listed above involve a notable outlay of time in the process of acquiring the surface data of an object due to the periods of inactivity which cannot be used for the acquisition of points, but which are necessary for the approach and withdrawal of the probe towards and away from the surface of the object.

OBJECT OF THE INVENTION

The object of this invention is to overcome the shortcomings of the known art, providing a method for the creation or generation of numerical models of surfaces, and in particular of sculptured surfaces, which is simple and economical to carry out and which at the same time ensures a high degree of reliability of the resulting model, limiting the number of points acquired on the actual model, so as to simplify and speed up the step of point acquisition which can be carried out by means of relatively inexpensive systems.

Another object of the invention is to provide a system for the creation or generation of numerical models of tridimensional surfaces which is precise, economical and quick and easy to carry out.

In order to achieve these objects, the subject of the invention is a method of the type indicated in the preamble of this description, comprising the steps of:

a) identifying at least one boundary on the surface of the actual model;

b) identifying a first plurality of points on the at least one boundary;

c) acquiring the values of the spatial coordinates of the first plurality of points by means of an acquisition system;

d) generating a first numerical representation of at least one theoretical surface having at least one boundary defined by the values of the spatial coordinates of the first plurality of points;

e) determining values representing a second plurality of nodal points belonging to the at least one theoretical surface;

f) operating the acquisition system to acquire the values of the spatial coordinates of a third plurality of actual points, directing the acquisition system towards the estimated positions of the nodal points of the second plurality;

g) generating a second numerical representation of at least one theoretical surface which satisfies the condition of at least passing through the points of the third plurality.

One advantage of the invention consists of the fact that the use of traditional type, generally expensive, continuous type probes is not necessary for the step of acquiring the points on the surface of the actual model, even though the method can also be applied advantageously to the point clouds acquired according to traditional systems so as to safeguard existing installed systems while ensuring the rapid and reliable generation of numerical models in a format suitable for subsequent processing with CAD programs, structural calculation programs or for the operation of numerical control equipment and machines.

In other words, in one of its embodiments, the system of this invention can be used in association with the known acquisition systems of "point clouds". In another of its forms, the system of the present invention involves the use of non-contact laser and similar type probes, both the measurement band type and the single point acquisition type. In an additional embodiment, the system uses acquisition machines with traditional mechanical probes.

Another advantage consists of the fact that the invention makes it possible to provide numerical models of surfaces also starting from actual surfaces that present discontinuities such as holes, cuts, superficial defects, sharp edges, tips and the like. In this way it is possible to generate numerical models also starting from the data of points acquired on the surface of complex, defective or imperfect quality actual objects, ensuring nevertheless a good definition of the numerical model of the surface.

If non-contact measurement band type probes are used, the system according to this invention makes it possible to eliminate the approach and withdrawal steps of the traditional probe towards and away from the surface of the object according to the directions perpendicular to it since these probes, fitted on measuring machines designed for continuous orientation of the probe, can "sweep" the actual surface of the object, following its shape thanks to the definition of the theoretical surface and of its theoretical perpendiculars, to acquire the coordinates of the actual points in correspondence with positions predefined by the theoretical points.

To obviate the need to provide measuring machines that can continuously orientate a probe on a continuous basis, certainly much more expensive and more difficult to find on the market with respect to traditional measuring machines, it is however possible to exploit the characteristics of non-contact type sensors, either measurement band type or single point acquisition type, to make the acquisition of points from the actual model faster then the known type of systems. In the known systems using contact probes, in fact, after the probe has approached the surface of the actual model and the coordinates of an actual point have been acquired, it is necessary to withdraw the probe from the surface of the model before it can be moved towards another point for the acquisition of the relative coordinates, in order to prevent mechanical interference of the probe with the surface of the model. The system of this invention, on the contrary, allows the probe to approach the surface of the actual model, acquire the point and subsequently proceed for a distance along the perpendicular, virtually "breaking down" the surface of the model, to move towards the next point, which will be acquired with a movement of the probe always along the perpendicular direction with respect to the surface of the model, but with a "withdrawing" movement from the surface. The resulting overall path of the probe is certainly shorter than that normally used in the known systems, and, during the experimental tests carried out by the applicant, made it possible to significantly reduce the acquisition times of the points of an actual tridimensional model and the consequent generation of a model of the surface of this model.

Compared with known acquisition systems using measurement band probes, a particular embodiment of the invention using this type of probe has the advantage of requiring less expensive probes because the distance of the probe from the surface of the object is optimized in such a way as to consequently minimize also the required measurement band. In this way it is also possible to use more precise probes. Furthermore, the acquisition of points on the surface of the object can be made in correspondence with predetermined points, thus reducing the quantity of information which is transferred to the processing system associated with the probe.

If, on the other hand, the system of this invention is integrated into the known "point cloud" acquisition systems, the numerical model of the resulting surface is accurate and easy to obtain, and does not involve an excessive load of numerical processing on the data of the point clouds.

In general, however, the system of this invention makes it possible to process optimized paths for the detection of points on the actual model, according to the characteristics of the probe used. For example, it is known that the non-contact fixed-focus known type of probes are able to correctly detect points on a surface whose perpendicular has an inclination with respect to a predetermined axial direction of the probe within around 20°–30°. The optimization of the paths makes it possible to group in one or more homogeneous groups all the theoretical points in which the perpendiculars with respect to the theoretical surface passing through these points present directions within a predetermined spherical angle, preferably around 40°–60°. This makes it possible to notably reduce the acquisition time of points on an actual surface, which is significantly affected by the probe re-orientation times to modify its predetermined axial direction. Naturally, what is said above regarding the optimization of the acquisition paths of non-contact fixed-focus probes, also applies to any other type of probe, for example the non-contact measurement band type and the traditional contact type.

BRIEF DESCRIPTION OF THE DRAWINGS

Additional characteristics and advantages of the invention will emerge from the following detailed description of preferred embodiments, with reference to the attached figures provided as non-limiting examples, in which:

FIG. 3 is a diagrammatic representation of the functioning principle of known acquisition systems using measurement band type laser probes, FIG. 4 systematically shows an acquisition system using non-contact type sensors suitable for being controlled by means of the method as per this invention.

DETAILED DESCRIPTION

Figure 1:
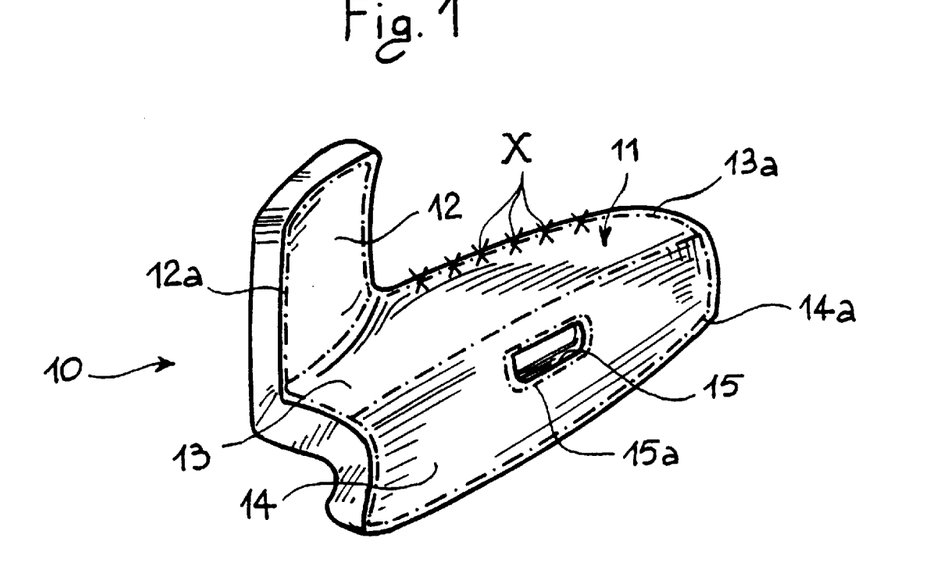
FIG. 1 is a perspective view of a general actual model with a sculptured surface.

With reference to FIG. 1, the reference number 10 generally indicates a tridimensional actual model whose surface 11 has a spatially curved shape with complex geometry. In spite of the complexity of the surface of the model 10 and in general of many models with sculptured surfaces, it s usually possible to identify one or more surface portions within which the variation of the curvature in a relatively extensive neighborhood of each point does not change abruptly. Naturally, the identifications of separate portions of the overall surface 11 of the model 10 is left to the choice of the expert technician and is part of an optimization step of the invention method. In more general terms, this optimization step may not be necessary or convenient for the purposes of the realization of the method described herein which may thus be applied to the surface 11 considered overall.

Once the surface portions 12, 13, 14, in which the overall surface 11 could be broken down to optimize its parametric representation, have been identified, a first stage of the invention method consists of the definition of the boundaries 12a, 13a, 14a of the surface portions, illustrated in FIG. 1 by dashed lines. A significant discontinuity 15, which in the example of FIG. 1 is a recess, but which could equally be a slot, a notch, or a bulge, a pin, a projection or the like, is in turn identified and a boundary 15a which surrounds it is defined in order to isolate the discontinuity from the rest of the surface 14.

By means of a point acquisition system of a generally known type, comprising for example a contact, optical, laser, magnetic or any other type of probe, the data of the spatial coordinates of a series of points X situated along the boundaries 12a, 13a, 14a, 15a and with a predefined distance between them are acquired. To simplify the representation, only some of these points X are indicated in FIG. 1. The linear distance between consecutive points X along the boundaries may be a fixed predetermined value, or may vary according to the tridimensional curvature of the contour in the neighborhood of each point X, or may be selected according to predefined or definable criteria by the operator.

The acquisition operation of points X can be carried out manually, successively positioning the probe sensor in correspondence with the actual points marked on the model 10. Automatic acquisition of the points X is also possible through the use of search and aiming or artificial viewing systems of the type generally known which, not being the subject of this invention, will not be discussed in any further detail.

Figure 2:
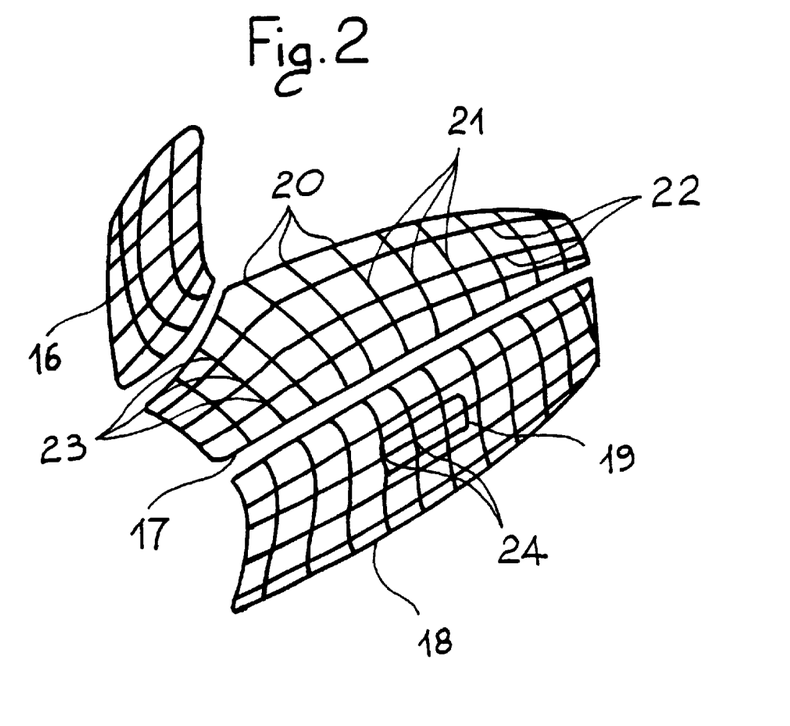
FIG. 2 is a graphic representation of a numerical model of tridimensional surfaces which copies the shape of the sculptured surface of the actual model in FIG. 1.

The values of the spatial coordinates of the points X of the boundaries 12a, 13a, 14a, 15a acquired on the actual model 10 are sent to an electronic processor programmed to generate output data representative of theoretical tridimensional curvilinear contours 16, 17, 18, 19 passing through the points X, as shown in FIG. 2. The points 20 positioned on the theoretical contours therefore coincide with the actual points X of the boundaries 12a, 13a, 14a, 15a.

The numerical definition of the theoretical contours 16, 17, 18, 19 is sent to the electronic processor programmed to provide a series of values representative of two families 21, 22 of theoretical isoparametric curves which define a theoretical surface and whose intersections define a series of theoretical nodes 23. The theoretical nodes 23 can naturally be defined as the intersection of an even greater number of families of isoparametric curves, just as they may also be determined as starting from a single family of curves, for example the family of curves 21, selecting points with a predefined linear distance between each other along the path of each curve 21. The isoparametric curves do not define the actual surface of the tridimensional model, but make it possible to define the best strategy for the choice of nodal points towards which the acquisition system should be aimed in the subsequent phase of acquisition of the points either on the actual model or within the high quantity of data grouped together in at least one point cloud which defines the actual model itself.

At the end of this phase, the computer provides a series of output values of the three spatial coordinates of each nodal point 23, in addition to the value of the perpendicular to the theoretical surface at each node point. These values will substantially coincide with the values of the points of the actual surface 11 close to the boundaries 16, 17, 18, 19, while they will tend in general to deviate from the values of the points of the actual surface the further they are from these boundaries.

The calculated values of the points 23 are thus used to command the acquisition system so that it detects the coordinates of the corresponding actual points on the model. In detail, the acquisition system is programmed to move a probe towards the model or in any case to aim the measuring member thereof at a point spatially defined by the value of each nodal point 23, along an approach direction directed according to the theoretical perpendicular calculated at the nodal point. On the basis of the overall spatial arrangement of the nodal points 23, this second acquisition step is optimized so as to minimize the path that the probe must follow to acquire the coordinates of all the actual points corresponding to the nodal points 23. furthermore, the approach of the probe to the surface 11 of the model according to the perpendicular calculated at each nodal point 23 can be broken down into two phases: a first phase of rapid approach up to a predetermined distance from the theoretical nodal point 23, and a slow approach phase until the probe touches the surface of the model 10, acquiring the actual coordinates of the points of the surface 11.

Due to the differences in value of the coordinates between the theoretical nodal points 23 and the corresponding actual points on the surface 11, the probe may come into contact with the surface during the rapid approach phase. In this case, an error condition activates a measurement repetition procedure so that the contact between the probe and the actual surface occurs during the slow approach phase to ensure precise acquisition of the actual point corresponding to the theoretical nodal point.

The acquisition system is programmed not to acquire the actual points which correspond to those nodal points 24 that lie within the boundary 19 which isolates the discontinuity 15. In this case, the coordinate values of the actual point, which would provide an incorrect representation of the numerical model of the surface 14, are replaced by the value of the theoretical points 24. In practice, in the subsequent generation of the numerical model of the surface 14, the fact of considering the theoretical points 24 in place of the actual points, which are not in any case available due to the discontinuity 15 of the surface, does not imply significant errors since the area within the boundary 15 is limited in size. At the end of the acquisition of the coordinate values of the actual points corresponding to the theoretical nodal points 23, these values are sent to the electronic processor programmed to generate numerical models of the surfaces 16, 17, 18, which satisfy the condition of passing through all the actual acquired points.

With a method according to this invention the total number of points acquired on the surface 11 of the actual model is substantially lower compared with the known methods which use continuous type probes. The calculation capacity necessary to process the acquired data is therefore notably reduced and allows considerable cost and time savings in generating a satisfactory numerical model. Moreover, by isolating the areas of discontinuity detectable on the actual model it is possible to generate a numerical or mathematical model of the sculptured surface which is easy to manipulate in subsequent CAD operations that are not weighed down by the presence in the model of accidental variations which would otherwise have to be corrected, as long as this is possible, by manual intervention on the values of the spatial coordinates of the nodal points.

This invention also presents the undoubted advantage of providing the acquisition system in advance with an estimated position of the nodal points 23 and a preferred approach direction towards the same, in order to optimize the path of the probe, thus reducing the overall time of acquisition and consequently of the generation of the numerical models of the sculptured surfaces.

Referring now to FIG. 4, an acquisition system of data of a surface 110 of a tridimensional object comprises a mobile arm 111 on which a measurement band type probe 112 is fitted, in particular a laser sensor, for example of the known type with the commercial name OTM manufactured by Dr. Wolf & Beck GmbH. The mobile arm 111 is operated by a drive system 113 of generally known type, controlled by an electronic processor 114 in which the spatial coordinates are memorized of a series of theoretical points T of a theoretical surface 115 whose shape approximates that of the actual surface 110 of the tridimensional object. Solely by way of an example, in FIG. 4 the theoretical surface 115 and the theoretical points T are shown in a graphic representation which can be displayed on the screen of the computer 114. The definition of the theoretical surface 115 can derive from its previous design by means of CAD programs, or from preliminary acquisition of predetermined points of an actual model. The method of generating the theoretical surface has been discussed above, and it has been clarified how the directions of the perpendiculars to this surface which pass through the theoretical points T can be obtained from the definition of the theoretical surface 115.

The data acquisition system also includes an interface 116 with an input port 117 to which the data provided by the probe 112 are sent. The interface 116 delivers these data to the computer 114 only when its circuit detects the presence of a enabling signal transmitted by the computer to the interface port 118. In a variation of the acquisition system, the interface 116 sends the data acquired from the probe 112 continuously to the computer port 119. In this case, however, the computer includes a register or memory location which can selectively assign a logical "true" or "false" value, and is programmed in such a way as to memorize the data received at the port 119 only when this logical value is "true". In this variation, the interface 116 may even be eliminated if the probe 112 transmits signals compatible with the data transmission protocol through the port 119 of the computer.

In the process of acquiring points on the surface of the object, the computer 114 commands the drive system 113 of the arm 111 to spatially position the probe 112 so that it can acquire the distance of actual points R coinciding, in first approximation, with the theoretical points T. In particular, the probe 112 is maintained at a distance $D_1$ from the actual surface 110 which lies within the range of the measurement band.

The total path which joins all the points T, and which is therefore followed by the probe 112 carried by the arm 111 throughout the acquisition process, is predetermined, on the basis of calculations made by the computer 114 in view of the geometric characteristics of the theoretical surface 115, in order to minimize it. In particular, in the path from a theoretical point T1 to the next one T2, the distance $D_1$ between the probe 112 and the actual surface 110 is always maintained within the range of the measurement band of the probe, which can thus have a selected very narrow width, favouring the precision of the instrument.

During the movement of the arm 111 and of the probe 112 from the generic point R1 to the next one R2, corresponding in first approximation to the consecutive theoretical points T1 and T2, the enabling signal to the port 118 of the interface 116 is disabled. In the variation of the above-mentioned acquisition system, the logical condition of the register or of the memory location of the computer 114 has a "false" value. Therefore, although throughout the passage from point R1 to point R2 the probe is at a distance from the surface 110 within the focusing zone, and thus transmits to the port 117 of the interface 116 (or directly to the port 119 of the computer, in the variation) a plurality of data on the distance from the surface 110, these data are not received or are ignored by the computer 114 until the arm 111 has positioned the probe 112 in correspondence with the arrival point R2. Alternatively, it is possible to use triggerable measurement band probes, which transmit the measurement data only in the presence of an enabling signal which, in this case, is provided by the computer 114 when the probe 112 reaches each point R.

On reaching point R2, the computer transmits an enabling signal to the port 118 of the interface 116. Likewise, in the case of the above-mentioned variation, the logical condition of the register or memory location of the computer is switched to the "true" value. The data sent by the probe 112 is thus acquired and memorized. Immediately after this, the enabling signal to the port 118 is disabled or the computer register switches to the "false" value. The computer then transmits the data necessary to keep the probe 112 moving to the next point R to the acquisition system 113.

It can thus be immediately noted that when the probe 112 reaches the acquisition position, it is not necessary to move it closer to and then further away from the surface 110 according to the perpendicular, as instead is necessary in known acquisition systems using mechanical or fixed focus probes. The acquisition method of predetermined points R of an actual surface 110 is therefore notably quicker, and thus more inexpensive, than known methods, also because it is not necessary to stop the arm 111 in correspondence with each of the acquisition positions.

By means of the method described above it is also possible to simply add a safety control which prevents accidental contact of the probe 112 with the surface 110 during the passage from one point to the next, should the theoretical coordinates of the generic point T differ substantially from those of the corresponding actual point R. Since the probe 112 constantly sends the data of its distance from the actual surface 110 to the interface 116 or, in the variation, directly to the computer 114, even though these points are not memorized the interface or the computer can however be programmed so that a warning signal is generated when the distance $D_1$ decreases below the lower limit of the measurement band of the probe 112. Likewise, a warning signal can be generated when the probe 112 moves away from the surface 110 beyond the upper limit of the measurement band. These warning signals can allow corrections to be made to the movement of the arm 111 and the path of the probe 112, either manually by the operator or automatically by the acquisition system itself.

In an alternative embodiment of the system according to this invention, the data of the surface 110 of the tridimensional actual model are acquired in advance with one of the known "point cloud" systems, i.e. through the use of sophisticated acquisition machines and continuous contact or non-contact type probes of generally known types. At the end of this acquisition, an enormous quantity of data representing an equally high number of points of the surface 100 is thus available. Naturally, as pointed out in the preamble to this description, it is impossible to use the data of the point cloud to generate numerical representations of the surface 110 without using surface schematisation methods. The known systems are normally of exclusively numerical types and are based on the search for one or more primitives that are directly derivable from the point cloud data and which can be calculated by the application of numerical algorithms. In addition to being particularly costly processes in terms of the calculation power required, the known types of systems often present problems of convergence which lead to numerical models which are often unsatisfactory.

The alternative embodiment of this invention comprises a manual control acquisition system, which can also be of a very simple type, not requiring a high degree of precision, for the acquisition of data of the boundary of predefined surfaces identified on the actual model, as described above with reference to the method of data generation of the theoretical surface. On the basis of the data acquired in this way, a computer is used to generate a numerical representation of theoretical surfaces which define a plurality of theoretical nodal points. The next step consists of identifying in the point cloud, which describes the surface of the actual model with a high degree of precision, those data which are closest to the coordinates of the theoretical nodal points. Substantially, the above-described method of positioning a probe at certain spatial points to acquire the data of the actual surface 110 is in this case completely repeated numerically, the point cloud being a faithful representation of the surface 100 of the actual model. The data of the theoretical nodal points are thus replaced with the data selected from the point cloud so as to correct the definition of the theoretical surface and define a numerical representation of the surface of the actual object previously acquired by means of one of the known continuous type acquisition systems.

In this way, it is possible to effectively combine the rapidity of acquiring and processing the boundary data of the actual surface 110 with the precision of the point cloud data.

Figure 5:
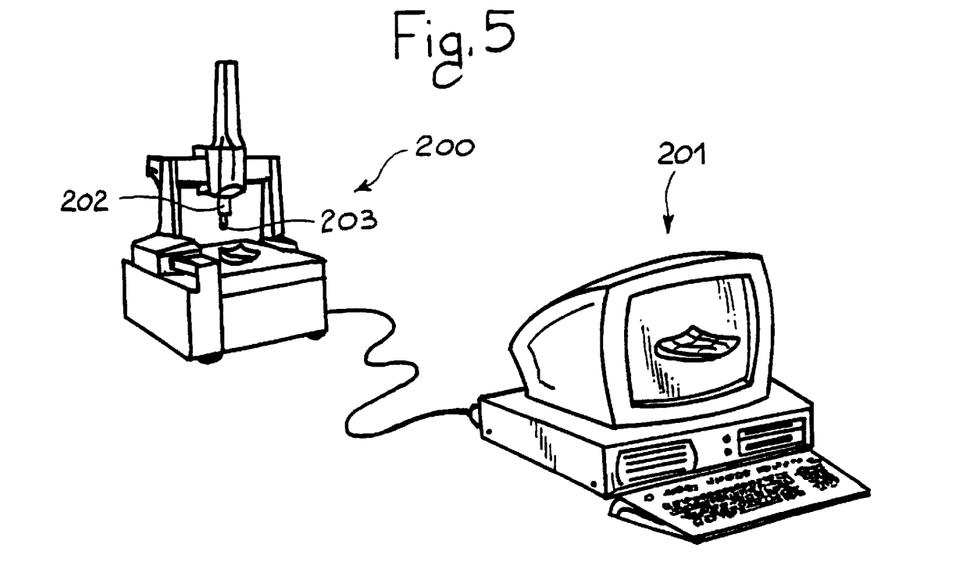
FIG. 5 is a representation of an acquisition system similar to the one in FIG. 4, using a traditional type machine for tridimensional measurements, and FIG. 6 schematically shows an optimized movement path of a non-contact single-point acquisition type probe.

In the previous description of the system illustrated in FIG. 4, reference was made, for the sake of clarity and generalization, to an arm 111 however it is mobile in space. In practice, the system of this invention was tested by connecting a known type of tridimensional measuring machine 200 to a processing system 201, programmed to carry out the phases of the method, as illustrated schematically in FIG. 5. In particular, the known tridimensional measuring devices or machines, such as for example the machine 200 in FIG. 5, present only limited possibilities for the spatial movement and orientation of a probe-holder 202, since the movement precision and overall sturdiness of the machine are necessarily favoured with respect to its flexibility in manipulating a probe to exactly follow a contour however it is oriented in space. Moreover, these machines being mainly suited for use with mechanical contact type probes, capable of detecting a point on the surface of an object regardless of their orientation in space, the movement possibilities are limited in the most common cases to translation along three axes. At times the possibility of releasing or re-orienting the probe 203 is foreseen, but this operation usually requires a long period of time compared to the acquisition times of points with a probe which is always oriented in the same way.

It should, nevertheless, be noted that the characteristics of machines 200 of the known type do not in any way limit the application of the method of this invention, but instead enhance its characteristics which allow the use of traditional measuring machines also for the detection of surfaces of particularly complex models, as well as the adoption of non-contact type probes instead of the traditional mechanical contact type probes.

Figure 6:
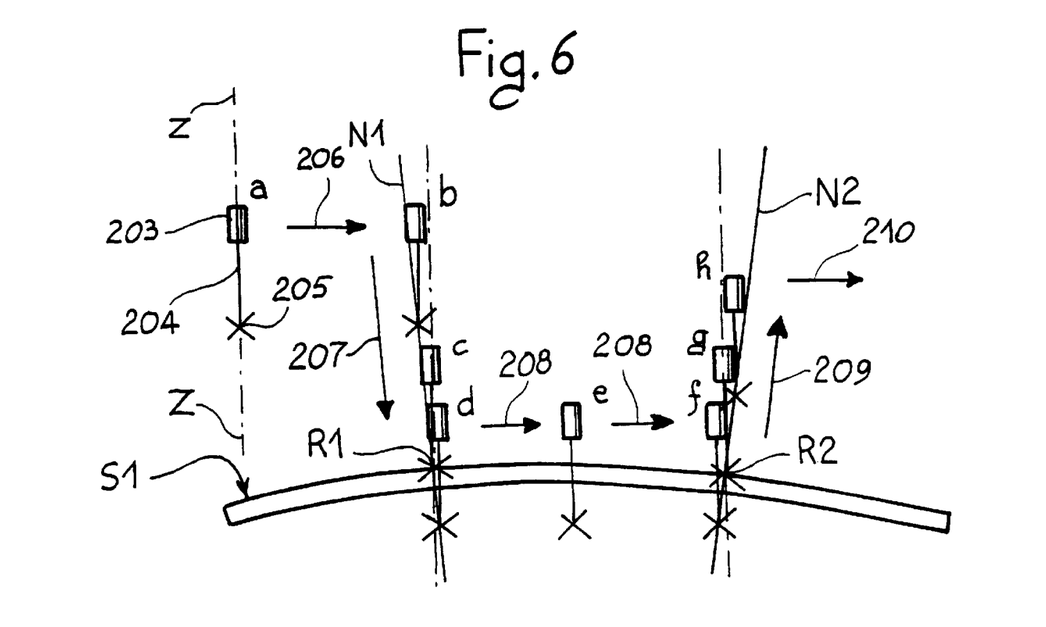

In FIG. 6, in fact, it is schematically illustrated, with intentionally altered proportions for the sake of clarity, a way of using a non-contact type probe 203, for example a laser probe, of the single-point acquisition type during the phase of acquisition of actual points according to the method of this invention. It is important to stress that the aforesaid type of probe can detect a point on the surface on condition that the perpendicular to the surface is inclined less than a predetermined value, for example less than ±20°–30°, with respect to a direction Z—Z predefined by the manufacturer of the probe, which for the purposes of this description we can take as being parallel to the probe 203 and to the laser beam 204 emitted by it (indicated conventionally in FIG. 6 with a continuous line, just as a cross 205 is similarly used to indicate the distance predefined by the manufacturer to mark single point acquisition).

One phase of processing the data of the theoretical points makes it possible first of all to identify groups of points in which the perpendiculars N1, N2 to the surface Si are inclined by values within the operating range of the Laser probe 203, if its inclination is fixed, for example at 90° with respect to the horizontal, as shown in FIG. 6. Let us suppose that two theoretical points corresponding to points R1 and R2 on the surface Si have been identified.

The acquisition movement of the points R1 and R2 by the non-contact type probe 203 preferably takes place according to an up and down path in which from a first position "a", the probe 203 is moved towards the position "b" in the direction of the arrow 206 until the acquisition point 205 is on the perpendicular N1 to the surface S1 passing through the theoretical point corresponding to the point R1. In a subsequent phase, the probe 203 is lowered parallel to the perpendicular N1 in the direction of the arrow 207, until the point R1 is detected when it reaches the position "c".

At this point, thanks to the fact that the probe 203 is of the non-contact type, its travel can continue, at least to a limited degree, downwards either in the direction of the arrow 207 or even in another direction, "breaking down" the surface S1. This possibility leads to a considerable shortening in the path of the probe 203 towards the subsequent point R2, with respect to a mechanical contact type probe, which must obviously be moved away from the surface of the actual model in an opposite direction to the approach path. Moreover, since it is not necessary to reverse the movement of the non-contact type probe after it has acquired point R1, the probe can approach the point R1 and the surface S1 at a greater speed than is possible with mechanical contact probes.

The probe can be moved towards the positions "e" and "f" in the direction of the arrows 208, remaining at a lesser distance from the surface S1 than the point acquisition distance, to then acquire point R2 in the position "g" which is reached from the position "f" with a withdrawal movement along the perpendicular N2 in the direction of the arrow 209. A further withdrawal moves the probe 203 to the position "h", similar to the position "a", from which it can move in the direction of the arrow 210 to acquire a third point on the surface S1.

The path described above is naturally a particular case and represents an example of what can be realized by applying optimization methods, many of which are known in the field of numerical calculation, to the method of this invention, which thus proves to be particularly suitable also for the solution of the technical and technological problems encountered to date in the use of the known means for the acquisition of points on surfaces of an actual model.

Without prejudice to the principle of the invention, the embodiments and the realization details can naturally vary widely without going beyond the object of the present invention.

What is claimed is:

1. A method for the creation of numerical models of surfaces by means of the acquisition of points from a tridimensional actual model, characterized in that it comprises the steps of:
   a) identifying at least one boundary (12a, 13a, 14a) on the surface (11) of the actual model (10);
   b) identifying a first plurality of points (X) on the at least one boundary (12a, 13a, 14a);
   c) acquiring the values of the spatial coordinates of the first plurality of points (X) by means of an acquisition system;
   d) generating a first numerical representation of at least one theoretical surface (16, 17, 18) having at least one boundary defined by the values of the spatial coordinates (20) of the first plurality of points (X);
   e) determining values representing a second plurality of nodal points (23) belonging to the at least one theoretical surface (16, 17, 18);
   f) operating the acquisition system to acquire the values of the spatial coordinates of a third plurality of actual points, directing the acquisition system towards the estimated positions of the nodal points (23) of the second plurality;

g) generating a second numerical representation of at least one theoretical surface which satisfies the condition of at least passing through the points of the third plurality.

2. A method according to claim 1, characterized in that in the second numerical representation, the at least one theoretical surface also satisfies the condition of passing through the points of the first plurality.

3. A method according to claim 1, characterized in that the method also comprises the step of identifying at least one boundary (15a) isolating predetermined areas of the surface (11) of the model, in particular discontinuous areas, and the further step of including certain points on the isolation boundary (15a) in the first series of points (X).

4. A method according to claim 3, characterized in that the acquisition system is programmed to ignore, during the acquisition step f), points on the surface (11) of the model which correspond to nodal points situated within a theoretical boundary (19) defined by the values of the spatial coordinates of the points of the first plurality (X) belonging to the isolation boundary (15a).

5. A method according to claim 1, characterized in that the values representing the second plurality of nodal points (23) comprise values of spatial coordinates and values of the perpendiculars to the at least one theoretical surface (16, 17, 18) at the nodal points, the acquisition system being operated to approach each point on the surface of the model in a position defined by the spatial coordinates of each estimated point (23) according to an approach direction parallel to the value of the perpendicular to each nodal point.

6. A method according to claim 1, characterized in that it comprises an optimization step, prior to the acquisition step f), in which the second plurality of nodal points is ordered in a predetermined sequence to minimize the path and/or the acquisition time of the third plurality of points by the acquisition system in the acquisition step f).

7. A method according to claim 6, characterized in that the optimization step comprises the definition of one or more homogeneous groups of nodal points (23) of the theoretical surface, each group comprising nodal points in which the perpendiculars to the theoretical surface passing through the said nodal points have directions comprised within a predetermined spherical angle.

8. A method according to claim 5, characterized in that the acquisition system comprises at least one non-contact type probe, the optimization step comprising the definition of a path of the probe for the acquisition of the points of the third plurality whereby the approach of the probe to the surface of the model according to the perpendicular to the surface at the nodal point takes place programmatically according to positive or negative directions with respect to the orientation of the perpendicular itself.

9. A method according to claim 8, characterized in that the approach of the non-contact type probe to each point on the surface of the model takes place alternatively according to positive and negative directions for consecutive points in the predetermined ordered sequence.

10. A method according to claim 1, characterized in that the surface of the tridimensional actual model is preliminarily defined by a high quantity of data grouped into at least one point cloud, the acquisition system comprising a processing module controlled programmatically to identify the values of the spatial coordinates of the third plurality of points in the at least one point cloud starting from the estimated position of the theoretical nodal points.

11. A system for the acquisition of data of surfaces of tridimensional models, characterized in that it comprises:
at least one non-contact type measurement band type probe (112),
actuating means (111, 113) for moving the probe (112), controllable by means of signals representing the coordinates of theoretical points (T),
transmission means (114) for transmitting the coordinates of the theoretical points (T) and for selectively receiving the data transmitted by the probe (112),
actuator means to selectively enable the reception of the data transmitted by the probe in correspondence with its arrival at positions determined univocally by the coordinates of the theoretical points (T).

12. A system according to claim 11, characterized in that the transmission and reception means comprise an electronic processor (114) connected to the probe (112) with the interposition of an interface (116), the actuator means comprising a circuit for the detection of an enabling signal for the selective transfer to the computer (114) of the signals coming from the probe.

13. A system according to claim 11, characterized in that the transmission and reception means comprise an electronic processor (114) connected to the probe (112), the actuator means comprising a register or memory location which memorizes data that can be selectively modified between a "true" value and a "false" value.

14. A system according to claim 11, characterized in that the probe (112) is a measurement band type laser probe.

15. A method for the acquisition of data of surfaces of tridimensional objects by means of non-contact type measurement band type probes, characterized in that it comprises the following steps:
a) identification of a first theoretical point (T1) defining a first univocal position of a measurement band type probe (112), situated at a distance from a first actual point (R1) on the surface of the object, the distance of the first actual point from the probe being included within the measurement band of the probe,
b) identification of a second theoretical point (T2) defining a univocal position of the probe situated at a distance from a second actual point (R2) included within the measurement band,
c) movement of the probe (112) from the first to the second theoretical point along a path during which the probe remains at a distance from the surface (110) of the object substantially included within the measurement band of the probe,
d) acquisition of the data transmitted by the probe (112), representative of the position of the second actual point (R2), on reaching the position defined by the second theoretical point (T2).

16. A method according to claim 15, characterized in that it comprises the additional steps of identification of an array of theoretical points (T), the acquisition of the data transmitted by the probe (112) in the movement from a position defined by one of the said theoretical points to the position defined by the subsequent theoretical point being inhibited.

17. A method according to claim 15, characterized in that it comprises an additional step of minimization or optimization of an open path joining all the theoretical points (T).

18. A method according to claim 15, characterized in that it comprises a continuous step of controlling the data transmitted by the probe (112) traveling from one position to the next, defined by consecutive theoretical points, to check that the distance between the probe and the actual surface (110) remains within the measurement band of the probe.

19. A system for the acquisition of surface data of tridimensional objects, characterized in that it comprises a point cloud type acquisition system generating a high quantity of data representing the points on the surface of a tridimensional object, a device for the acquisition of points on the tridimensional object supplying a computer with data identifying a reduced plurality of selected points from at least one predefined boundary on the surface of the tridimensional object, the computer being programmed to generate a numerical representation of at least one theoretical surface having a boundary defined by the data of the reduced plurality of points and defining a plurality of theoretical nodal points, the computer also being programmed to identify, within the point cloud data, the acquired actual nodal data which are closest to the data of the theoretical nodal points, the theoretical nodal points of the at least one theoretical surface being replaced by the acquired actual nodal data to define the numerical representation of the at least one surface of the tridimensional object.

20. A system for the creation of a numerical model representing a tridimensional actual model, characterized in that it comprises a measuring device for the acquisition of measurement data of the aforesaid actual model, processing means being connected to the measuring device to control the process of data acquisition, to receive identification data of actual points on the surface of the model acquired by the measuring device, and to create a numerical model of a surface passing through said actual points, the processing means also receiving initial data representing initial points situated on at least one predetermined boundary on the surface of the actual model and processing at least one set of data representing theoretical nodal points belonging to a theoretical surface with a boundary passing through the initial points, the processing means also controlling the measuring device in sequence towards positions and along directions defined by the theoretical nodal points for the acquisition of the actual points on the surface of the model in the neighborhood of the theoretical nodal points.

* * * * *